United States Patent
Wesche et al.

(10) Patent No.: US 12,371,039 B2
(45) Date of Patent: Jul. 29, 2025

(54) METHOD OF A VEHICLE FOR CONTEXT-DEPENDENT ERROR PROCESSING BY MEANS OF HETEROGENEOUS VERIFICATION, AND VEHICLE

(71) Applicant: VOLKSWAGEN AKTIENGESELLSCHAFT, Wolfsburg (DE)

(72) Inventors: Maximilian Wesche, Edemissen (DE); Tobias Kain, Oberndorf/Melk (AT); Julian-Steffen Müller, Hannover (DE); Marcel Aguirre Mehlhorn, Wolfsburg (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 199 days.

(21) Appl. No.: 18/546,275

(22) PCT Filed: Feb. 14, 2022

(86) PCT No.: PCT/EP2022/053487
§ 371 (c)(1),
(2) Date: Aug. 13, 2023

(87) PCT Pub. No.: WO2022/175197
PCT Pub. Date: Aug. 25, 2022

(65) Prior Publication Data
US 2024/0124006 A1    Apr. 18, 2024

(30) Foreign Application Priority Data
Feb. 19, 2021    (DE) ..................... 10 2021 201 632.4

(51) Int. Cl.
*B60W 50/12*    (2012.01)
*G07C 5/08*    (2006.01)

(52) U.S. Cl.
CPC ........... *B60W 50/12* (2013.01); *G07C 5/0808* (2013.01)

(58) Field of Classification Search
CPC ............... B60W 50/12; B60W 50/035; B60W 2050/0292; B60W 2050/0295;
(Continued)

(56) References Cited

U.S. PATENT DOCUMENTS

| 9,555,740 B1 | 1/2017 | Zhu et al. |
| 11,427,213 B2 | 8/2022 | Ewert |

(Continued)

FOREIGN PATENT DOCUMENTS

| DE | 102017204603 A1 | 9/2018 |
| DE | 102017214611 A1 | 2/2019 |

(Continued)

OTHER PUBLICATIONS

International Search Report; International Patent Application No. PCT/EP2022/053487; Jun. 14, 2022.

*Primary Examiner* — Michael V Kerrigan
(74) *Attorney, Agent, or Firm* — BARNES & THORNBURG LLP (57) ABSTRACT

A method of a transportation vehicle for context-dependent processing of a potential error of a vehicle component. The method includes determining a current context of the transportation vehicle and of at least one vehicle component of the transportation vehicle that is heterogeneous in the current context. In response to at least one heterogeneous vehicle component being determined, a heterogeneous verification of the potential error is performed taking into account the at least one heterogeneous vehicle component. In response to no heterogeneous vehicle component being determined, a context-dependent relevance of the vehicle component is determined. Based on the determined context- (Continued)

dependent relevance, then either the potential error of the vehicle component is handled or an emergency operating mode of the transportation vehicle is initiated. Also disclosed is a transportation vehicle having a control unit to perform the method.

18 Claims, 7 Drawing Sheets

(58) Field of Classification Search
CPC ..... B60W 2050/0297; B60W 50/0225; B60W 50/029; B60W 50/0205; G07C 5/0808
See application file for complete search history.

(56) References Cited

U.S. PATENT DOCUMENTS

| | | |
|---|---|---|
| 2016/0217627 A1* | 7/2016 | Khalaschi ................ G07C 5/02 |
| 2020/0156651 A1 | 5/2020 | Golov |
| 2020/0180653 A1 | 6/2020 | Chi et al. |
| 2020/0283007 A1 | 9/2020 | Choi |
| 2022/0126832 A1 | 4/2022 | Ewert |

FOREIGN PATENT DOCUMENTS

| | | |
|---|---|---|
| DE | 102018212025 A1 | 1/2020 |
| DE | 102019201607 A1 | 8/2020 |
| DE | 102019205900 A1 | 10/2020 |

\* cited by examiner

METHOD OF A VEHICLE FOR CONTEXT-DEPENDENT ERROR PROCESSING BY MEANS OF HETEROGENEOUS VERIFICATION, AND VEHICLE

PRIORITY CLAIM

This patent application is a U.S. National Phase of International Patent Application No. PCT/EP2022/053487, filed 14 Feb. 2022, which claims priority to German Patent Application No. 10 2021 201 632.4, filed 19 Feb. 2021, the disclosures of which are incorporated herein by reference in their entireties.

SUMMARY

Illustrative embodiments relate to a method of a transportation vehicle for context-dependent processing of a potential error of a vehicle component, optionally by heterogeneous verification. Illustrative embodiments further relate to a transportation vehicle, having at least one vehicle component and a control unit which is designed to carry out the disclosed method.

BRIEF DESCRIPTION OF THE DRAWINGS

Disclosed embodiments are explained in detail below with reference to the drawings, in which.

DETAILED DESCRIPTION

Modern transportation vehicles are complex technical systems having a multiplicity of interacting vehicle components. The identification and handling of errors in these vehicle components is safety-relevant, since even a single error in one of the components can have a critical impact on the entire system. Reliable error processing is crucial, especially in the case of vehicles which transport people.

Error processing is highly significant, particularly in the domain of autonomous driving. Automatically operating transportation vehicles offer numerous facilities for improving driving safety and the driving experience for a driver. However, the autonomy of the driver in terms of his driving decisions is increasingly transferring to the transportation vehicle or to control units operating therein. The end result of these developments is an autonomously driving transportation vehicle which can maneuver entirely without human intervention.

SAE J3016 categorizes automated transportation vehicles at different levels. In autonomously driving vehicles at SAE levels 4 and 5, the systems responsible for the autonomous driving operate partially or fully autonomously. This also means that there is only partial provision, or even no provision at all, for driver intervention. Careful monitoring of all systems to detect and handle errors quickly and precisely is then critical.

Conventional error processing methods usually compare the behavior of vehicle components under test with previously defined static limit values and, if an error has been detected, execute predefined error handling protocols. However, the use of static limit values and defined error handling protocols is inadequate when dealing with the multifaceted and diverse requirement profiles of different driving scenarios in the case of autonomously operating transportation vehicles. In terms of safety during autonomous driving operation, a sensor, for example, may need to be evaluated differently during highway driving compared with urban driving. The error processing methods known from the prior art are incapable or only partially capable of replicating this diversity.

The disclosed embodiments enhance the prior art and overcome, or at least reduce, the drawbacks resulting therefrom, and of providing an improved method for processing potential errors in vehicle components.

This is achieved by a method and transportation vehicle.

A first exemplary embodiments relates to a method of a transportation vehicle for processing a potential error in a vehicle component. Within the meaning of this disclosure, a transportation vehicle may be a method of transportation which is designed to transport persons and/or goods on the ground, in the air and/or in space. The vehicle may be a passenger vehicle having an internal combustion engine, an electric or hybrid motor. The transportation vehicle may be a vehicle designed for autonomous driving and, for example, for operation in accordance with SAE level 4 or 5. An error within the meaning of this disclosure is an impermissible deviation of a feature from a predefined requirement. The potential error of the vehicle component may be determined by the transportation vehicle itself in a context-dependent manner. The context-dependent determination of a potential error is explained in detail below.

The disclosed method comprises determining a current context of the transportation vehicle. The context may define an environment and/or driving situation of the transportation vehicle. The context replicates, for example, the conditions in which the transportation vehicle is performing highway driving or urban driving, in which it is day or night and/or in which it is dry or raining. The context can similarly replicate the conditions in which the transportation vehicle is performing manual, partially automated or fully automated driving. The level of detail of the replication of an environment and/or driving situation of the transportation vehicle by the context can vary. The context can be determined on the basis of data acquired in the transportation vehicle and/or externally, as will be explained in detail below.

At least one vehicle component of the transportation vehicle that is heterogeneous in the current context is further determined in the method. A vehicle component may be determined as heterogeneous if it is used or is usable in the current context for the same function as the vehicle component under test, and its structure differs from the vehicle component under test.

If at least one heterogeneous vehicle component is determined in the disclosed method for the vehicle component under test, a heterogeneous verification of the potential error of the vehicle component is then carried out, taking into account the at least one heterogeneous vehicle component.

If no heterogeneous vehicle component is determined for the vehicle component under test, a context-dependent relevance of the vehicle component is determined. The relevance of the vehicle component in the current context to the safe operation of the transportation vehicle may be determined. Either the potential error of the vehicle component is then handled or an emergency operating mode of the transportation vehicle is initiated on the basis of the determined context-dependent relevance.

Handling the error may comprise determining and performing actions to finally eliminate the error or limit its effects in the first instance. Handling the potential error furthermore may comprise countermeasures for reducing the probability of serious consequences. Handling the error comprises, for example, restarting the vehicle component, calibrating the vehicle component, resetting the settings of the vehicle component or shutting down the vehicle component. If the vehicle component is shut down, the tasks and/or functions of the vehicle component may be transferred to at least one other component of the transportation vehicle. The at least one other component can take charge of some of the functionalities of the vehicle component concerned. The emergency operating mode of the motor transportation vehicle may cause the vehicle to switch to a safe state. The switchover to a safe state may comprise providing a reduced number of emergency functionalities. The switchover to a safe state furthermore may comprise an emergency braking and/or emergency shutdown of the transportation vehicle.

The disclosed method enables a more exact and more application-specific error processing by taking into account the current context of the transportation vehicle, resulting in increased safety. In the error processing method according to the prior art, the situation in which the transportation vehicle finds itself at the time of the error determination and processing was ignored. However, distinctions can be made in the processing of an error depending on the context. If, for example, the near-field camera of a transportation vehicle fails during a parking procedure of the transportation vehicle, a termination of the procedure, for example, by emergency braking, is one possible error handling action. However, if a failed near-field camera were similarly handled with emergency braking while the transportation vehicle was located on the highway, this error handling action would represent a considerable safety risk. According to the present disclosure, this circumstance is taken into account and an improved method for the error processing of transportation vehicle components is provided and the safety of the transportation vehicle is therefore increased by incorporating the current context of the transportation vehicle.

In at least one exemplary embodiment of the disclosed method, it is provided that a heterogeneous vehicle component differs structurally from the vehicle component and is designed to perform the tasks and/or functions of the vehicle component. A heterogeneous vehicle component may be designed to perform the tasks and/or functions of the vehicle component in the current context. A heterogeneous vehicle component may be designed to take charge of at least some of the functionalities of the vehicle component.

Structurally different vehicle components which are designed for similar tasks can be found within a multiplicity of vehicle components installed in a modern transportation vehicle. In a specific context, heterogeneous vehicle components of this type can take charge of tasks even if they are not designed as redundant in relation to the vehicle component. A LIDAR sensor, for example, for distance measurement during parking could also be replaced by an ultrasound sensor, since no large measuring ranges are required in this context. Diversity is furthermore often used in modern transportation vehicles as a strategy for increasing resilience. Different implementations and no identically designed individual systems or components are used here by heterogeneous vehicle components. This is based on the notion that systems which perform the same function but are implemented differently also have different sensitivities or are insensitive to a given fault and will therefore probably not all fail simultaneously. Particularly safety-relevant processes, for example, are often controlled by a plurality of control units which are supplied in some instances by different manufacturers and their software has been written by a plurality of independent programmers in different programming languages. If one of the control units has an error, an error-free heterogeneous control unit takes charge of its tasks.

In at least one exemplary embodiment of the disclosed method, it is provided that the heterogeneous verification comprises determining that no potential error of the at least one heterogeneous vehicle component is present. In other words, it is determined during the context-dependent verification that the at least one heterogeneous vehicle component is error-free. It may be determined that a majority of the at least one heterogeneous vehicle components are error-free. In a further method operation, a context-dependent relevance of the vehicle component may then be determined. The relevance of the vehicle component in the current context to the safe operation of the transportation vehicle may be determined. Either the potential error of the vehicle component is handled or an emergency operating mode of the transportation vehicle is then initiated on the basis of the determined context-dependent relevance, optionally as described above. The handling further comprises transferring the tasks and/or functions of the vehicle component to the at least one error-free heterogeneous vehicle component.

In a further exemplary embodiment of the disclosed method, it is provided that the heterogeneous verification comprises determining that a potential error of the at least one heterogeneous vehicle component is present. This method operation may be alternative to and simultaneous with the determination described above that no potential error of the heterogeneous vehicle component is present. In other words, it is determined during the context-dependent verification that the at least one heterogeneous vehicle component similarly has a potential error. It may be determined that a majority of the at least one heterogeneous vehicle components have a potential error. Sample values and/or diagnostic values of the vehicle component and the at least one heterogeneous vehicle component are then compared in a further method operation. A sample value and/or diagnostic value of the vehicle component may be compared with a plurality of sample values and/or diagnostic values of the at least one heterogeneous vehicle component. Sample values are always compared with sample values, or diagnostic values with diagnostic values.

In the disclosed method, either the potential error of the vehicle component under test is rejected or a context-dependent relevance of the vehicle component under test is determined on the basis of the result of the comparison of the sample values and/or diagnostic values. If a context-dependent relevance is determined, either the potential error of the vehicle component is handled or an emergency operating mode of the transportation vehicle is initiated on the basis of the relevance, as described above. If the potential error is rejected, the disclosed method may be restarted with the determination of a further potential error of the vehicle component, wherein the error determination is adapted if necessary.

A further exemplary embodiment of the disclosed method further comprises determining at least one homogeneous vehicle component of the transportation vehicle. The determination of the homogeneous vehicle component may be performed before the determination of the heterogeneous vehicle component. The determination of the heterogeneous component may further be performed in addition to or as an alternative to the determination of the homogeneous vehicle component. A homogeneous vehicle component may be structurally identical to the vehicle component and is designed to perform the tasks and/or functions of the vehicle component. In other words, it is determined whether the transportation vehicle has at least one vehicle component which is identical to the vehicle component under test. It may be determined whether the vehicle component is redundantly designed. A vehicle component may be determined as homogeneous if it is used or is usable for the same function as the vehicle component under test.

If at least one homogeneous vehicle component is determined, a homogeneous verification of the potential error, taking into account the at least one homogeneous vehicle component, optionally follows in a further method operation. The homogeneous verification may comprise the operations of: determining whether a potential error of the at least one homogeneous vehicle component is present; if no potential error of the at least one homogeneous component is present: handling the potential error of the vehicle component; if a potential error of the at least one homogeneous vehicle component is present: comparing sample values and/or diagnostic values of the vehicle component and the at least one homogeneous vehicle component; and, based on the comparison: rejecting the potential error of the vehicle component; or determining a context-dependent relevance of the vehicle component, and handing the potential error of the vehicle component or initiating an emergency operating mode of the transportation vehicle on the basis of the determined context-dependent relevance. If the potential error is rejected, the disclosed method may be restarted with the determination of a further potential error of the vehicle component, wherein the error determination is adapted if necessary. Alternatively, based on the comparison, the method may not be continued with the rejection of the potential error, but with the determination of at least one heterogeneous vehicle component, as described above.

As a result of both the homogeneous and the heterogeneous verification, incorrectly determined errors are not handled and resources and energy are thus saved.

A heterogeneous verification offers the additional benefit that commonly caused outages, i.e., outages which occur in redundant components and are statistically dependent on one another, can also be identified therewith.

In a further exemplary embodiment of the disclosed method, it is determined in the comparison of the sample values and/or diagnostic values whether the sample values and/or diagnostic values of the vehicle component under test are located within a range of dispersion of sample values and/or diagnostic values of the at least one heterogeneous vehicle component. In the comparison of the sample values and/or diagnostic values of the vehicle component with those of the at least one homogeneous vehicle component, it is furthermore determined whether the sample values and/or diagnostic values of the vehicle component under test are located within a range of dispersion of sample values and/or diagnostic values of the at least one homogeneous vehicle component.

The range of dispersion may be the range within which a majority of the sample values and/or diagnostic values of the at least one heterogeneous or homogeneous vehicle component are located. The range of dispersion is defined, for example, as an interval around an expectation value or median of the diagnostic values. The range of dispersion is defined, for example, by the interquartile interval. Alternatively, intervals between other quantiles can be chosen as the range of dispersion, for example, the interval between the terciles. The potential error of the vehicle component is rejected if the sample value and/or diagnostic value of the vehicle component under test is located within a range of dispersion of sample values and/or diagnostic values of the at least one heterogeneous or homogeneous vehicle component. The context-dependent relevance of the vehicle component under test is otherwise determined. If the context-dependent relevance of the vehicle component is determined, either the potential error of the vehicle component is handled or an emergency operating mode of the vehicle component is initiated on the basis of the relevance, as described above. If the potential error is rejected, the disclosed method may be restarted with the determination of a further potential error of the vehicle component, wherein the error determination is adapted if necessary.

A further exemplary embodiment of the disclosed method provides that the determination of a potential error of a vehicle component is performed in each case in a context-dependent manner. The potential error of the vehicle component may be determined in this way. The potential error of the at least one heterogeneous and/or homogeneous vehicle component is likewise determined in this way.

Determining the potential error initially comprises determining a sample value of the vehicle component within at least one determined metric. Within the meaning of this disclosure, a metric may be a reference system for measuring quantifiable variables. At least one suitable metric may be assigned to each vehicle component for monitoring purposes. The at least one metric of the vehicle component and the at least one metric of the at least one homogeneous and/or heterogeneous vehicle component may match one another. The assignment may already performed during the manufacture of the respective vehicle component. The metrics assigned to each vehicle component may be stored in a first lookup table, LUT. The component-specific metric is optionally determined by consulting the LUT. The metric may be a scale for plotting a measured quantity of a sensor, an estimated data volume in a line and/or in a memory, expected outputs of a software component, a RAM and/or CPU utilization, a speed and/or acceleration of the transportation vehicle, a current strength, a voltage and/or a temperature. In other words, the metric represents a space for each vehicle component in which sample values relating to the component can be plotted against one another and compared with one another. Each metric may be defined by a norm, in particular, an interval norm, for comparing sample values. The sample value may be determined within the determined metric as an output of the vehicle component in ongoing operation of the vehicle component. Alternatively, the vehicle component may be excited with an input to determine the sample value. The sample value may be determined by a sensor on the vehicle component.

A set of limit values is further determined within the determined metric during the determination of the potential error, depending on the current context. A lower and an upper context-dependent limit value are optionally determined within the determined metric. The context-dependent limit values may be stored in a second LUT. The first LUT and the second LUT may be parts of a single LUT. The set of limit values may be determined by consulting the LUT. The LUT may be stored locally on a memory of the transportation vehicle or is retrieved from a server of a network. The transportation vehicle may be designed to manage and update the LUT. If the disclosed method is restarted after the rejection of the potential error of the vehicle component, the transportation vehicle may update the limit values in the LUT based on feedback. The limit values may be updated in such a way that the sample value associated with the rejected potential error lies within the updated limit values. The limit values may likewise be updated in such a way that the diagnostic value associated with the rejected potential error lies between 0 and 1 if it is determined on the basis of the updated limit values. The limit values may be updated in such a way that a majority of the sample values of the at least one homogeneous and/or heterogeneous vehicle component lie within the updated limit values. The limit values may furthermore be updated in such a way that a majority of diagnostic values which are determined by the majority of the sample values and the updated limit values lie between 0 and 1. The server may likewise be designed to manage and update the LUT. The server optionally communicates with a multiplicity of transportation vehicles which carry out the disclosed method, and updates the LUT on the basis of feedback from the multiplicity of transportation vehicles. The management of the LUT by a server of a network or by the transportation vehicle therefore results in a continuous adaptation and improvement of the LUT and therefore the limit values that are used.

A plurality of metrics for monitoring the vehicle component may be determined during the determination of the potential error, and a sample value and a set of context-dependent limit values are determined in each case for each of the plurality of metrics. The potential error may be determined by of each of the plurality of metrics. A multi-dimensional definition of context-dependent error states is possible through the use of a plurality of metrics per vehicle component, thereby further increasing the application-specific nature of the error detection. The statistical relevance of the error determination can further be increased through the use of a plurality of metrics.

In a further operation, a diagnostic value may be determined as a quotient of the difference between the determined sample value and the lower limit value and the difference between the upper limit value and the lower limit value. In other words, the diagnostic value is determined as a result of the following formula:

$$\text{Diagnostic value} = \frac{\text{sample value} - \text{lower limit value}}{\text{upper limit value} - \text{lower limit value}}$$

In other words, the diagnostic value is formed through a normalization of the sample value onto the set of limit values.

Scaled diagnostic values for all components of the transportation vehicle are determinable with the disclosed method by determining the diagnostic value according to the embodiment described above. The diagnostic value thus enables comparability of vehicle components which are monitored by different metrics. The overall state of the transportation vehicle can thus be simply determined. The determination of the diagnostic value further offers the benefit that a diagnostic value of this type additionally allows a more precise state of the vehicle components to be identified. If, for example, a decision has to be made between two redundant vehicle components, the diagnostic value is beneficial if it has been determined as a floating-point number. When deciding between two vehicle components with the diagnostic values 0.9 and 0.6, the decision will fall in favor of the second vehicle component. Both diagnostic values are valid, but the second lies closer to the optimum diagnostic value of 0.5, which defines the optimum functional capability.

A potential error may furthermore be determined if the sample value does not lie within the determined limit values and/or if the diagnostic value does not have a value between 0 and 1.

The embodiment described above enables a more exact and more application-specific error determination through the use of the context-dependent limit values of a component-specific metric. This results in increased safety of the transportation vehicle. In the error processing method by checking a vehicle component according to the prior art, the situation in which the transportation vehicle finds itself at the time of the check was ignored. However, it is possible for a behavior of a vehicle component to be error-free or even desirable in a specific context, whereas the same behavior would be dangerous in a different context. If, for example, a control unit of the transportation vehicle sets a speed of 130 km/h on a highway, this is a completely normal behavior. However, if this happens in a pedestrian zone, an error must be assumed. According to the present disclosure, this circumstance is taken into account and an improved error determination of vehicle components is provided and the safety of the transportation vehicle is therefore increased by incorporating the current context of the transportation vehicle.

In at least one exemplary embodiment of the disclosed method, the context is defined depending on a plurality of parameters characterizing an environment and/or a driving situation of the transportation vehicle. An environment of the transportation vehicle may be characterized by parameters which relate to the surroundings of the transportation vehicle, such as, for example, geographical data, weather data, traffic data and legal requirements. A driving situation may be characterized by parameters which relate to the transportation vehicle itself, such as, for example, a state of the assistance systems, an SAE level, the number of passengers, a range or a route that is still to be travelled. The parameters may be determined by sensors of the transportation vehicle and/or on the basis of external inputs. The context can be determined by the transportation vehicle itself and/or by an external server. The context may consist of a plurality of subcontexts. A subcontext optionally comprises a single feature of the environment and/or driving situation of the transportation vehicle, such as, for example, the weather or the road type. The context optionally corresponds to an operational design domain, ODD, determined by the vehicle. According to the SAE J3016 standard, an ODD comprises conditions under which a given driving automation system, or feature thereof, is specifically designed to function.

In a further exemplary embodiment of the disclosed method, the relevance is determined taking into account a failure rate of the vehicle component that is permissible in the current context and/or an availability of vehicle components that are heterogeneous and/or homogeneous in the current context. The relevance may be determined as low if a high failure rate of the vehicle component is permissible in the current context. The relevance may furthermore be calculated as low if at least one vehicle component that is heterogeneous or homogeneous in the current context is available. The available heterogeneous and or homogeneous vehicle component may be error-free. A heterogeneous vehicle component can perform the same tasks and/or functions as the vehicle component in the current context. A LIDAR sensor, for example, for distance measurement during parking could also be replaced by an ultrasound sensor, since no large measuring ranges are required in this context. The relevance may furthermore be determined taking into account an event tree analysis. The event tree analysis optionally determines possible consequences of the potential error of the vehicle component. The relevance may be determined as low if the determined consequences are categorized as not safety-relevant. The error handling as described above may be performed whenever the determined relevance falls below a predetermined relevance limit value. The emergency operating mode as described above may likewise be initiated whenever the determined relevance exceeds a predetermined relevance limit value.

A further exemplary embodiment relates to a transportation vehicle, in particular, a passenger vehicle, having an internal combustion engine, an electric motor or a hybrid engine. The transportation vehicle may be a vehicle designed for automated driving and, for example, for operation in accordance with SAE level 4 or 5. The transportation vehicle may have a vehicle component. The transportation vehicle further has a control unit which is designed to carry out the method described above for context-dependent processing of a potential error of the vehicle component.

At least one exemplary embodiment of the disclosed transportation vehicle has a multiplicity of vehicle components. The control unit may be designed to carry out a method as described above for each of the multiplicity of vehicle components. The control unit optionally carries out the method in each case by determining a diagnostic value, as described above. The control unit may be designed to assign a diagnostic value determined in the respective method to each of the multiplicity of vehicle components. The control unit may furthermore be designed to identify an overall state of the transportation vehicle based on the determined diagnostic values.

A further exemplary embodiment relates to a computer program, comprising commands which, when the program is executed by a computer, such as, for example, a control unit of a transportation vehicle, prompt the latter to carry out the disclosed method, as described above.

A further exemplary embodiment relates to a computer-readable storage medium, comprising commands which, during the execution by a computer, such as, for example, a control unit of a transportation vehicle, prompt the latter to carry out the disclosed method, as described above.

The different embodiments specified in this application may be combinable with one another, unless otherwise stated in individual cases.

Figure 1:
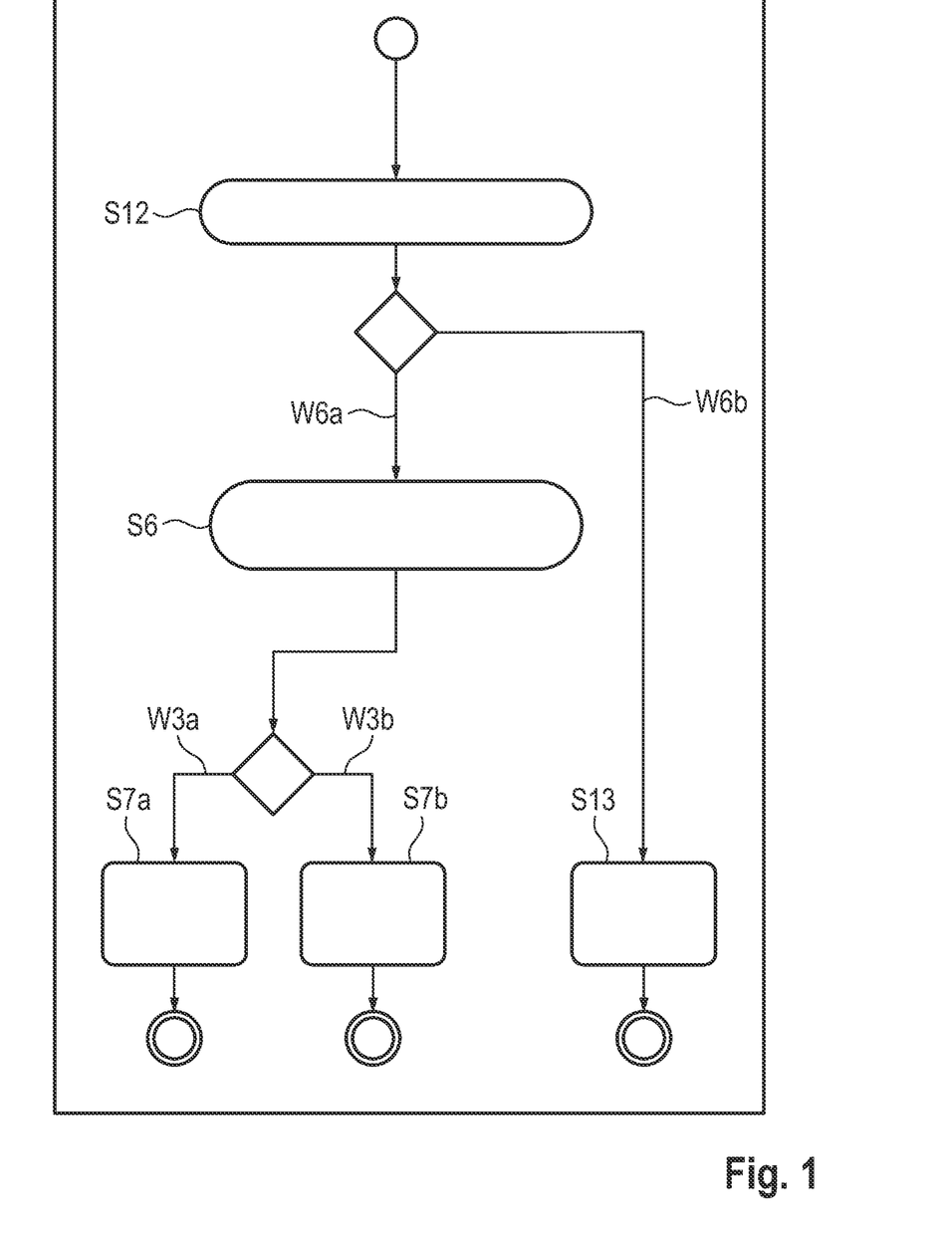
FIG. 1 shows a schematic flow diagram of a disclosed method.
Figure 5:
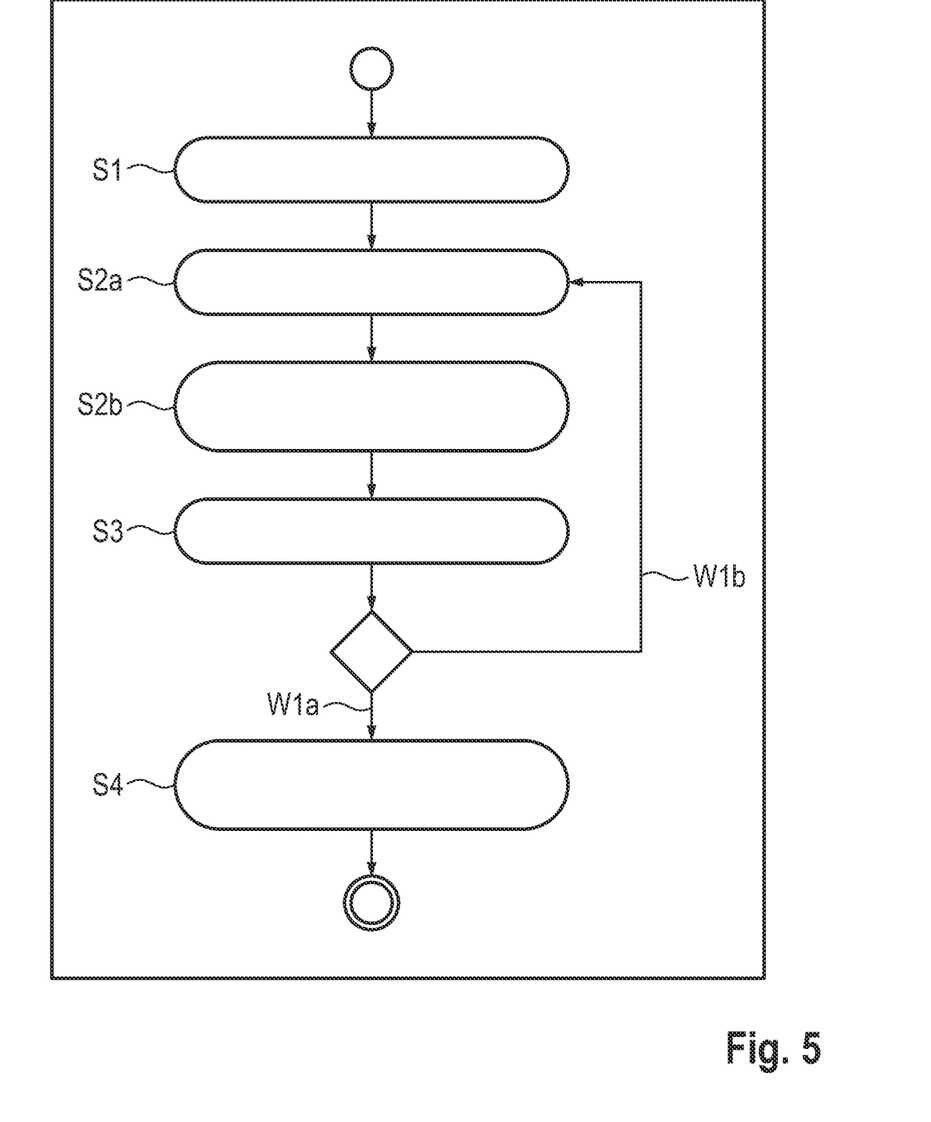
FIG. 5 shows a schematic flow diagram of a determination of a potential error according to one exemplary embodiment of a disclosed method operation.

FIG. 1 shows a schematic flow diagram of a disclosed method for processing a potential error of a vehicle component. In this exemplary embodiment, the potential error of the vehicle component is determined by the transportation vehicle itself in a context-dependent manner. The context-dependent determination of a potential error is shown in FIG. 5 and is explained in detail below.

A current context of the transportation vehicle is initially determined in a twelfth method operation at S12. The context defines, in particular, an environment and/or driving situation of the transportation vehicle. The presence of at least one heterogeneous vehicle component of the transportation vehicle is further determined in method operation at S12.

If no heterogeneous vehicle component is determined in method operation at S12, the method follows the eleventh path W6a and a context-dependent relevance of the vehicle component is determined in the sixth method operation at S6. The relevance of the vehicle component in the current context to the safe operation of the transportation vehicle is determined, in particular, in method operation at S6.

If the relevance is determined as low in method operation at S6, in particular, if it falls below a predetermined relevance limit value, the method follows the fifth path W3a. The potential error of the vehicle component is then handled in the seventh method operation at S7a. The handling comprises, for example, restarting the vehicle component, calibrating the vehicle component, resetting the settings of the vehicle component or shutting down the vehicle component while simultaneously transferring the tasks of the vehicle component to a homogeneous vehicle component.

If the relevance is determined as high in method operation at S6, i.e., if it falls, in particular, below a predetermined relevance limit value, the method follows the sixth path W3b. An emergency operating mode of the transportation vehicle is then initiated in the next method operation at S7b. The emergency operating mode of the transportation vehicle causes the transportation vehicle, in particular, to be switched to a safe state, i.e., for example, only a reduced number of emergency functionalities are still provided, an emergency braking or an emergency shutdown is performed.

If at least one heterogeneous vehicle component is determined in method operation at S12, the method follows the twelfth path W6b. In the thirteenth method operation at S13, a heterogeneous verification of the potential error of the vehicle component is then started, in particular, a heterogeneous verification taking into account the at least one heterogeneous vehicle component, as shown by way of example in FIG. 3.

Figure 2:
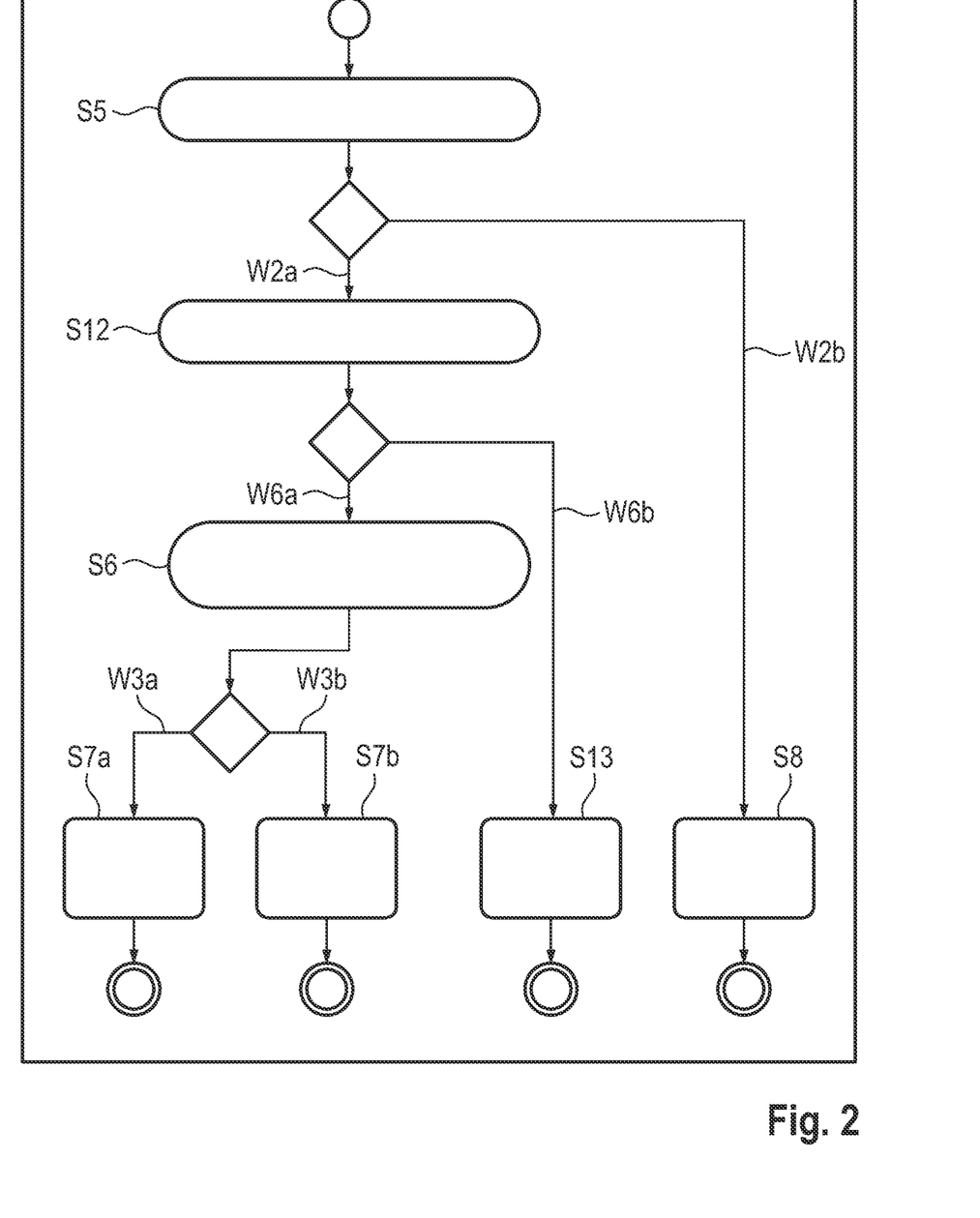
FIG. 2 shows a schematic flow diagram of a disclosed method according to one exemplary embodiment.

In at least one exemplary embodiment of the disclosed method, which is shown by way of example in FIG. 2, a current context of the transportation vehicle is initially determined in a fifth method operation at S5. The context defines, in particular, an environment and/or driving situation of the transportation vehicle. The presence of at least one homogeneous vehicle component of the transportation vehicle is further determined in method operation at S5.

If at least one homogeneous vehicle component is determined in method operation at S5, the method follows the fourth path W2b. In the eighth method operation at S8, a homogeneous verification of the potential error of the vehicle component is then started, in particular, a homogeneous verification taking into account the at least one homogeneous vehicle component, as shown by way of example in FIG. 4.

If no homogeneous vehicle component is determined in method operation at S5, the method follows the third path W2a. The presence of at least one heterogeneous vehicle component is then determined in the twelfth method operation at S12, as described above. The further method operations correspond to those described for FIG. 1.

Figure 3:
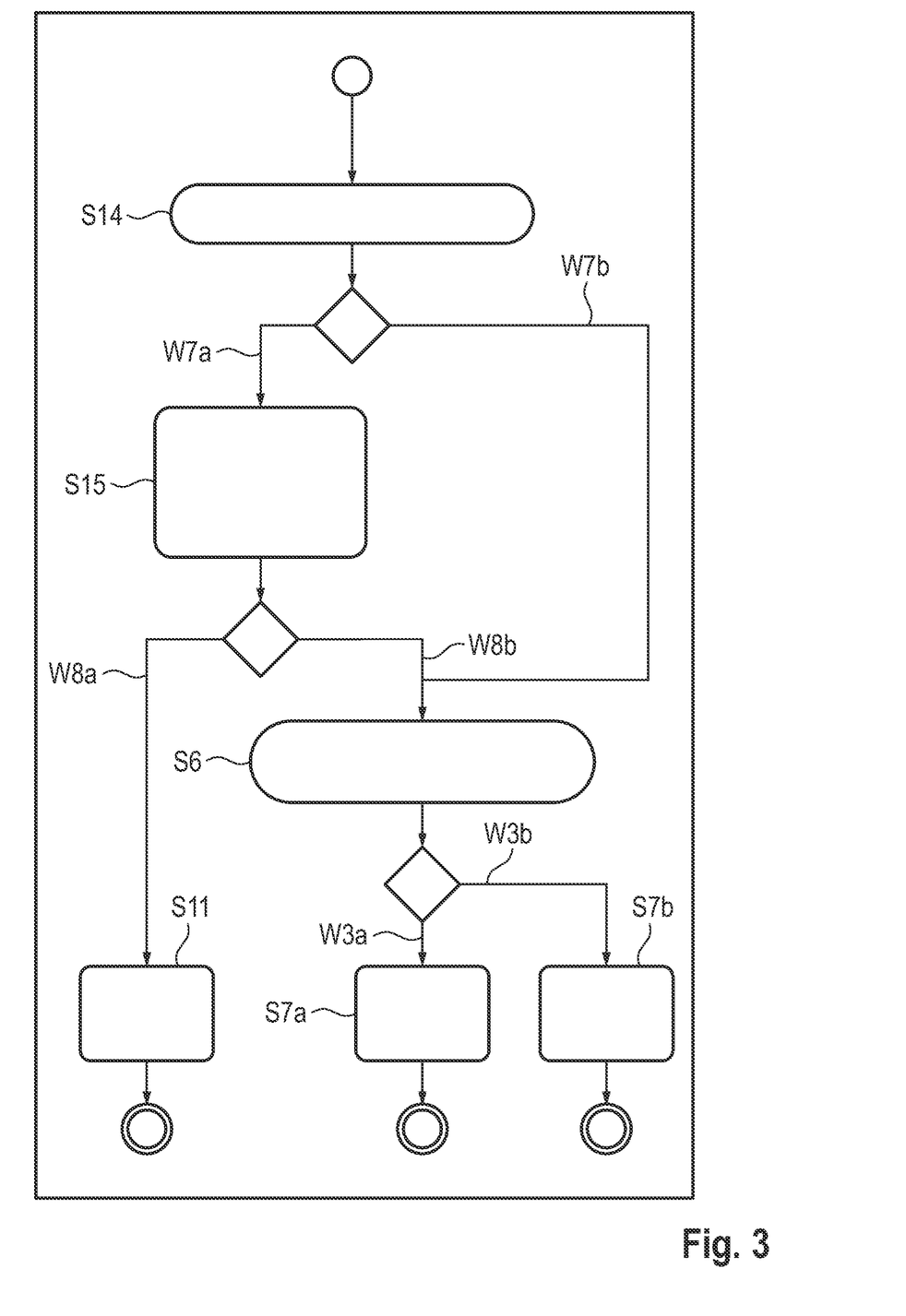
FIG. 3 shows a schematic flow diagram of a heterogeneous verification of a disclosed method according to one exemplary embodiment.

The heterogeneous verification according to at least one exemplary embodiment of the disclosed method is shown schematically in FIG. 3. A fourteenth method operation at S14 comprises determining whether a potential error of the at least one heterogeneous component is present. If it is determined in method operation at S14 that a potential error of the at least one heterogeneous vehicle component is present, in particular, that a majority of the at least one heterogeneous vehicle components have a potential error, the method follows a thirteenth path W7a.

In a fifteenth method operation at S15, a sample value and/or diagnostic value of the vehicle component is then compared with a plurality of sample values and/or diagnostic values of the at least one heterogeneous vehicle component. In particular, it is determined whether the sample value and/or diagnostic value of the vehicle component lies within a range of dispersion of sample values and/or diagnostic values of the at least one heterogeneous vehicle component. The range of dispersion is the range within which a majority of the diagnostic values of the at least one heterogeneous vehicle component are located.

If the sample value and/or diagnostic value of the vehicle component lies within a range of dispersion of sample values and/or diagnostic values of the at least one heterogeneous vehicle component, the method follows a fifteenth path W8a. In an eleventh method operation at S11, the potential error of the vehicle component is then rejected and the disclosed method is restarted with the determination of a further potential error of the vehicle component. The context-dependent limit values of the error detection are adapted here on the basis of the range of dispersion of the heterogeneous vehicle components determined in operation at S15.

If it is established in operation at S15 that the sample value and/or diagnostic value of the vehicle component lies outside the range of dispersion of the sample values and/or diagnostic values of the at least one heterogeneous vehicle component, the method follows a sixteenth path W8b. A context-dependent relevance is then determined in method operation at S6, as described above. On the basis of the determined relevance, similarly as described above, the method then follows either the fifth path W3a and the potential error of the vehicle component is then handled in method operation at S7a, or it follows the sixth path W3b and an emergency operating mode of the transportation vehicle is initiated in method operation at S7b.

If it is determined in method operation at S14 that no potential error of the at least one heterogeneous vehicle component is present, the method follows a fourteenth path W7b. A context-dependent relevance is then determined in method operation at S6, as described above, and the potential error of the vehicle component is either handled or an emergency operating mode is initiated on the basis of the determined relevance. In this case, the handling optionally comprises transferring the tasks and/or functions of the vehicle component to the at least one heterogeneous vehicle component which has been determined as error-free in method operation at S14.

Figure 4:
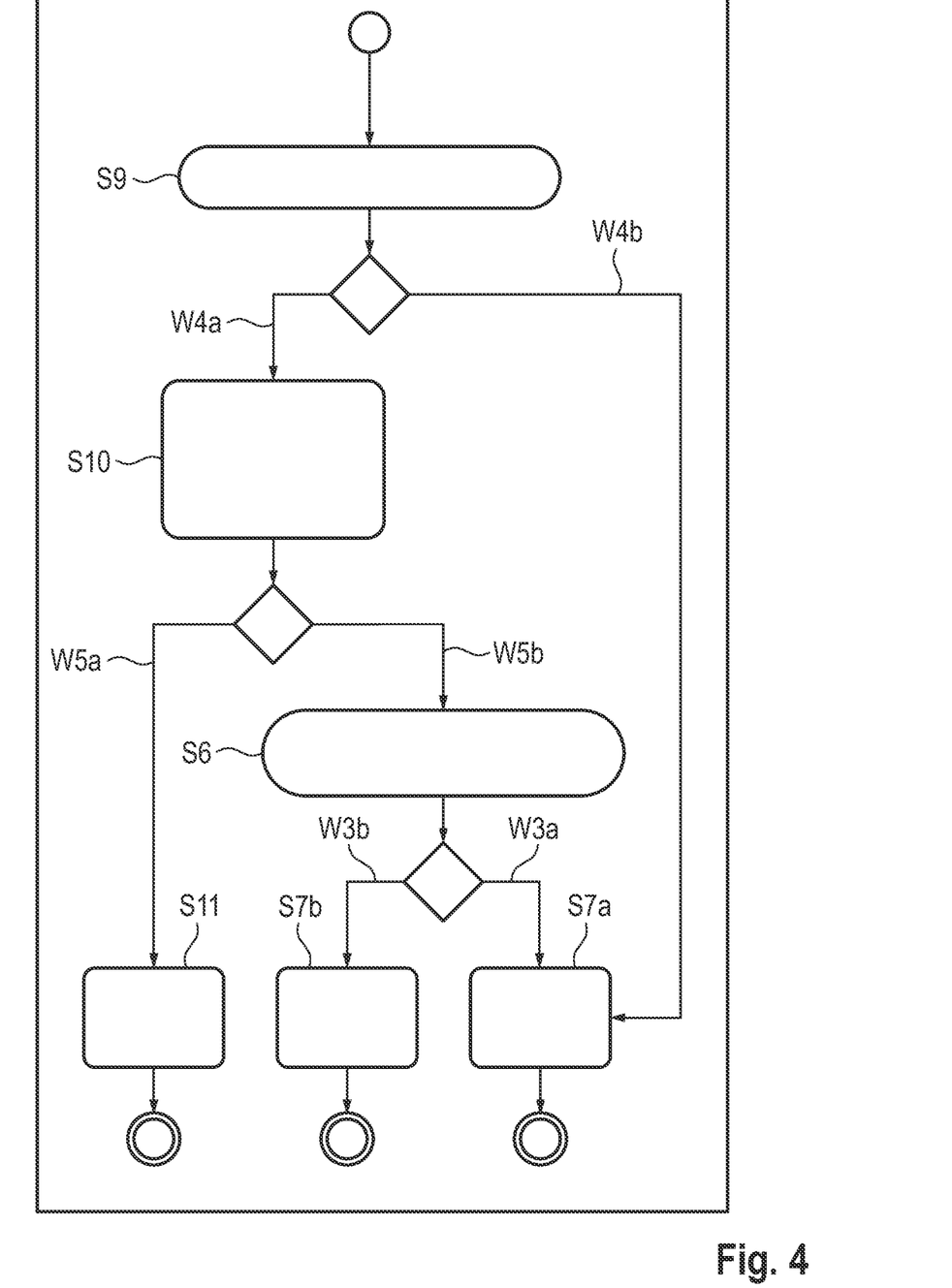
FIG. 4 shows a schematic flow diagram of a homogeneous verification of a disclosed method according to one exemplary embodiment.

The homogeneous verification according to one exemplary embodiment of the disclosed method is shown schematically in FIG. 4. A ninth method operation at S9 comprises determining whether a potential error of the at least one homogeneous component is present. If it is determined in method operation at S9 that no potential error of the at least one homogeneous vehicle component is present, the method follows an eighth path W4b. The potential error of the vehicle component is then handled in method operation at S7b, as described above. In this case, the handling optionally comprises transferring the tasks and/or functions of the vehicle component to the at least one homogeneous vehicle component which has been determined as error-free in method operation at S9.

If it is determined in method operation at S9 that a potential error of the at least one homogeneous vehicle component is present, in particular, that a majority of the at least one homogeneous vehicle components have a potential error, the method follows a seventh path W4a.

In a tenth method operation at S10, a sample value and/or diagnostic value of the vehicle component is then compared with a plurality of sample values and/or diagnostic values of the at least one homogeneous vehicle component. In particular, it is determined whether the sample value and/or diagnostic value of the vehicle component lies within a range of dispersion of sample values and/or diagnostic values of the at least one homogeneous vehicle component. The range of dispersion is the range within which a majority of the diagnostic values of the at least one homogeneous vehicle component are located.

If the sample value and/or diagnostic value of the vehicle component lies within a range of dispersion of sample values and/or diagnostic values of the at least one homogeneous vehicle component, the method follows a ninth path W5a. In an eleventh method operation at S11, the potential error of the vehicle component is then rejected and the disclosed method is restarted with the determination of a further potential error of the vehicle component. The context-dependent limit values of the error detection are adapted here on the basis of the range of dispersion of the homogeneous vehicle components determined in operation at S10.

In an alternatively exemplary embodiment, the ninth path W5a leads to the twelfth method operation at S12 and the presence of at least one heterogeneous vehicle component is determined in this operation, as described above. The method is then continued, starting from method operation at S12, as described above.

If it is established in operation at S10 that the sample value and/or diagnostic value of the vehicle component lies outside the range of dispersion of the sample values and/or diagnostic values of the at least one homogeneous vehicle component, the method follows a tenth path W5b. A context-dependent relevance is then determined in method operation at S6, as described above. On the basis of the determined relevance, similarly as described above, the method then follows either the fifth path W3a and the potential error of the vehicle component is then handled in method operation at S7a, or it follows the sixth path W3b and an emergency operating mode of the transportation vehicle is initiated in method operation at S7b.

FIG. 5 shows a schematic flow diagram of a determination of a potential error according to at least one exemplary embodiment of the disclosed method. A component-specific metric and a current context of the transportation vehicle are determined in the first method operation at S1. A sample value is determined within the determined metric in the first part of the second method operation at S2a. In the second part of the method operation at S2b, a set of limit values is then determined depending on the context determined in the first method operation at S1.

The third method operation at S3, in which a diagnostic value is determined, then follows. The diagnostic value is determined here as a quotient of the difference between the determined sample value and the lower limit value and the difference between the upper limit value and the lower limit value. The diagnostic value is therefore determined as the result of the following formula:

$$\text{Diagnostic value} = \frac{\text{sample value} - \text{lower limit value}}{\text{upper limit value} - \text{lower limit value}}$$

If the determined diagnostic value was determined as not lying between 0 and 1 in method operation at S3, the method follows the first path W1a. A context-dependent processing of the determined error is then started in the fourth method operation at S4, as explained in detail above. If the diagnostic value is classified as valid, the method follows the second path W1b. In this case, no error has been determined. The method then restarts in the first part of the second method operation at S2a with the determination of the sample value.

Figure 6A:
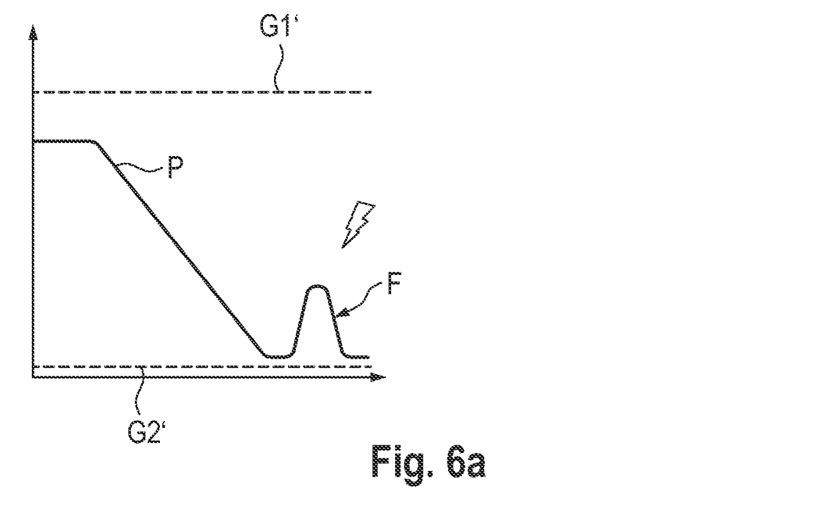
FIG. 6a shows a graphical representation of a sample value determined by way of example over a time period and static limit values.
Figure 6B:
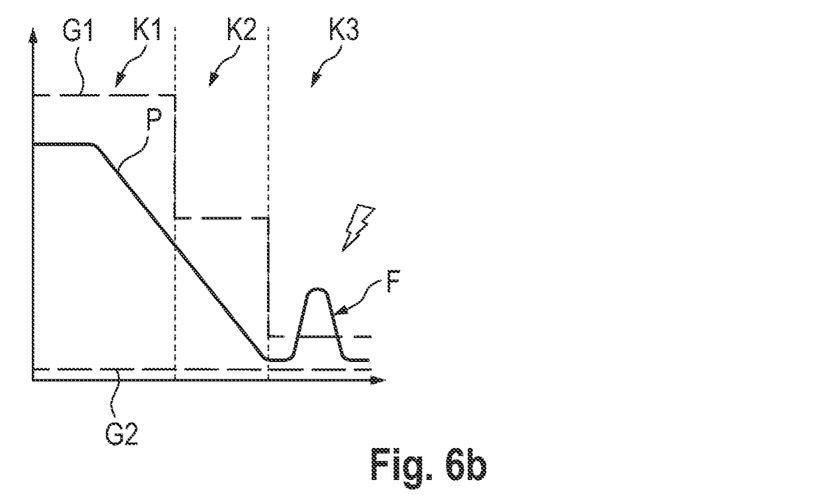
FIG. 6b shows a graphical representation of a sample value determined by way of example over a time period and context-dependent limit values.

FIG. 6a and FIG. 6b in each case illustrate by way of example through a graphical representation how a sample value P and limit values G1, G2, G1', G2' are determined over a time period and compared. FIG. 6a shows static limit values G1', G2' and FIG. 6b shows context-dependent limit values G1, G2.

The sample value P is determined within a determined metric. In the disclosed method, the metric is determined specifically for the respective vehicle component to be monitored. Sensors normally have, for example, defined working ranges. This working range can be used to indicate whether the data supplied by the sensor are correct. Switches are equipped with message buffers to process a plurality of messages. The maximum number of messages in the buffer is known. A possible overloading of the switches can therefore be identified by monitoring the number of messages in the buffer. Applications which are required for the operation of the transportation vehicle perform actions on a set of input parameters and supply an output, wherein this output can be used as a metric to monitor the respective application. It is also possible for a vehicle component to be monitored with a plurality of metrics. Both the utilization and the throughput, for example, can be used as a metric in a software component. In such a case, the disclosed method may be carried out with the plurality of metrics.

The control unit of a transportation vehicle is intended to be monitored in the example shown in FIGS. 6a and 6b. The output of the control unit contains, for example, instructions which control the longitudinal and lateral movement of the transportation vehicle. An output for a speed of the transportation vehicle to be set has therefore been determined here by way of example as a metric.

The sample value P determined within the metric is shown as a continuous line. It initially assumes a high speed, which then decreases over time except for a short, abrupt rise. The rise in the determined sample value P is indicated by a lightning bolt, since an error F of the control unit can be assumed here.

FIG. 6a shows how the sample value P is compared with a set of static limit values G1', G2' which are shown as dashed lines. The lower limit value G2' has the value 0 km/h and the upper limit value G1 has the value of the maximum speed of the transportation vehicle. The sample value P lies continuously between the static limit values G1', G2', as a result of which the error F is not determined.

In FIG. 6b, the sample value P is compared with a set of context-dependent limit values G1, G2. The lower limit value G2 in turn has the value 0 km/h. the upper limit value G1 assumes different values depending on the respective context K1, K2, K3. In the first context K1, the transportation vehicle is on a highway without a prescribed maximum speed. The upper limit value G1 therefore assumes the maximum speed of the transportation vehicle. In the second context K2, the transportation vehicle is in a city and therefore the upper limit value G1 is determined at a speed of 50 km/h. In the third context K3, the transportation vehicle is on a parking lot and therefore the upper limit G1 assumes walking pace. In the third context K3, the sample value P then lies outside the limit values G1, G2. The error F is determined and can be handled.

The example shown in FIGS. 6a and 6b illustrates the benefit of the context-dependent error determination of the disclosed method. The method enables a more exact determination of errors F of vehicle components and therefore results in increased safety of the transportation vehicle. To enable a more precise error determination, a context K1, K2, K3 consists, in particular, of a plurality of subcontexts. If, for example, the context K1 also contained the "rain" or "tailback" subcontext in addition to the "highway" subcontext, the speed of the upper limit G1 would be determined as lower.

Figure 7:
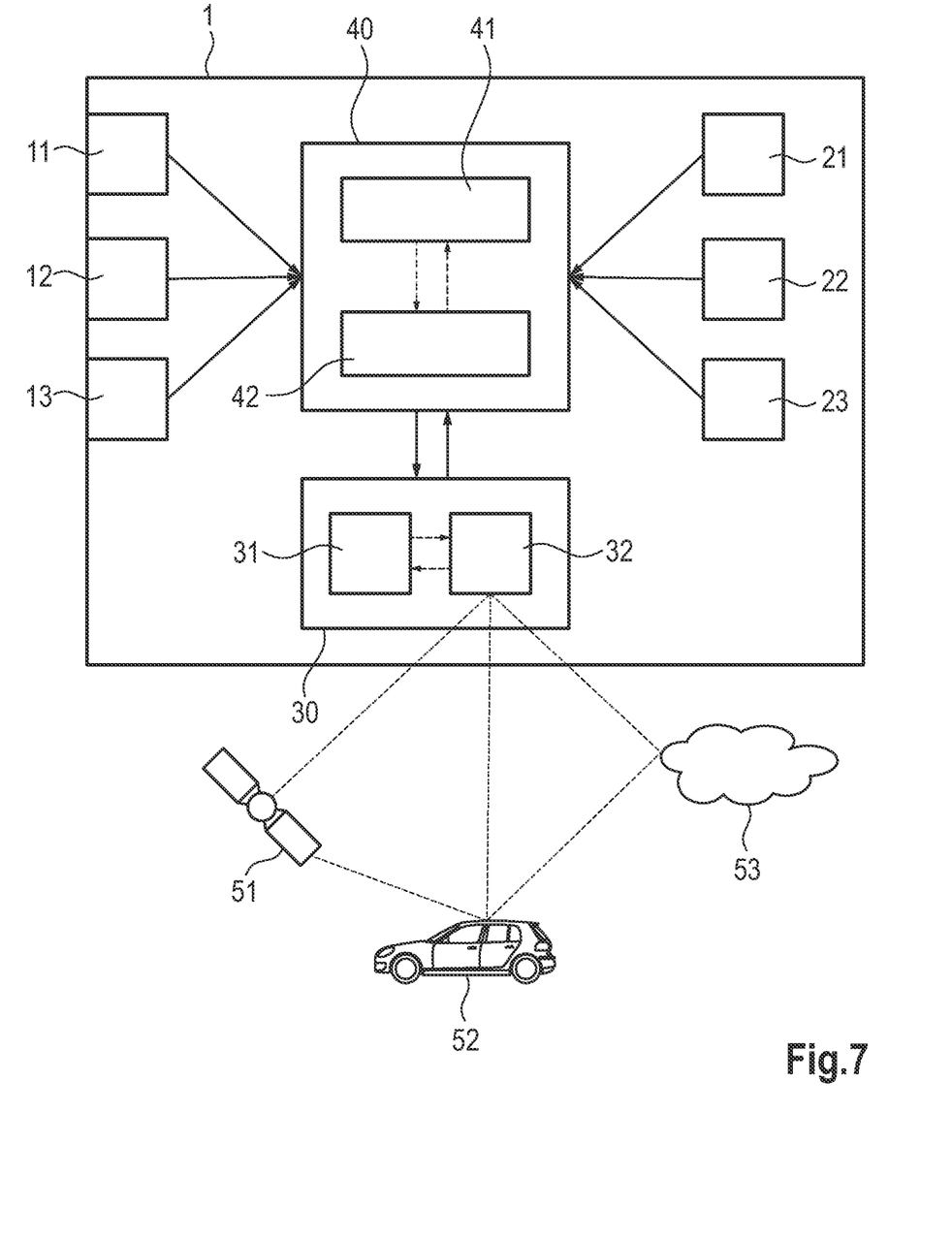
FIG. 7 shows a schematic view of a disclosed transportation vehicle according to one exemplary embodiment.

FIG. 7 shows a schematic view, in particular, a block diagram, of an example of a transportation vehicle 1, in particular, a two-track transportation vehicle, having an internal combustion engine, an electric motor or a hybrid engine. The transportation vehicle 1 is configured, in particular, to perform autonomous driving at SAE level 4 or 5. The transportation vehicle 1 comprises a multiplicity of vehicle components.

Some of the vehicle components consist of a multiplicity of first sensors, in particular, a first sensor 11, a second sensor 12, and a third sensor 13. The first sensors 11, 12, 13 are configured to capture environmental data of the transportation vehicle 1 and comprise, for example, a camera for recording an image of a roadway located in front of the transportation vehicle 1, traffic signs and/or roadway boundaries, distance sensors, such as, for example, ultrasound sensors, for measuring distances to objects surrounding the transportation vehicle 1, thermometers for recording an ambient temperature of the transportation vehicle and/or a rain sensor to capture weather data. The first sensors 11, 12, 13 transmit the environmental signals captured by them to a control unit 40 of the transportation vehicle 1.

The transportation vehicle 1 further has a plurality of second sensors as further vehicle components, in particular, a fourth sensor 21, a fifth sensor 22 and a sixth sensor 23. The second sensors 21, 22, 23 are sensors for determining transportation vehicle data relating to the transportation vehicle 1 itself, in particular, current location and movement information of the transportation vehicle 1. The second sensors are consequently, for example, speed sensors, acceleration sensors, inclination sensors or the like. The second sensors 21, 22, 23 transmit the state signals captured by them to a control unit 40 of the transportation vehicle 1.

A further vehicle component is furthermore a communication module 30 having a memory 31 and one or more transponders or transceivers 32. The transponder 32 is a radio, WLAN, GPS or BLUETOOTH® transceiver or the like, in particular, a transponder configured for communication in a communication network. The transponder communicates with the internal memory 31 of the communication module 30, for example, via a suitable data bus. The current position of the transportation vehicle 1, for example, can be determined by the transponder 32 by communicating with a GPS satellite 51, and can be stored in the internal memory 31. In addition, the communication module 30 is configured to communicate via V2V communication with another transportation vehicle 52, optionally via a communication network 53. The communication module 30 can furthermore also be configured for communication with a server of the communication network 53. The communication module 30 also communicates with the control unit 40. In particular, it transmits received data to it and/or receives data to be transmitted from it.

The communication network 53 may be a network according to the 3GPP standard, for example an LTE, LTE-A (4G) or 5G communication network. The communication network can further be configured for the following operations or according to the following standards: High Speed Packet Access (HSPA), a Universal Mobile Telecommunication System (UMTS), UMTS Terrestrial Radio Access Network (UTRAN), evolved UTRAN (e-UTRAN), Global System for Mobile communication (GSM), Enhanced Data rates for GSM Evolution (EDGE), GSM/EDGE Radio Access Network (GERAN). Alternatively or additionally, the communication network can also be designed according to one of the following standards: Worldwide Interoperability for Microwave Access (WIMAX) network IEEE 802.16, Wireless Local Area Network (WLAN) IEEE 802.11. Similarly, the communication network optionally uses one of the following coding methods: Orthogonal Frequency Division Multiple Access (OFDMA), Time Division Multiple Access (TDMA), Code Division Multiple Access (CDMA), a Wideband-CDMA (WCDMA), Frequency Division Multiple Access (FDMA) or Spatial Division Multiple Access (SDMA), etc.

The transportation vehicle 1 further has a control unit 40 which is configured for fully automated driving operation, in particular, for the longitudinal and lateral guidance of the transportation vehicle 1. The control unit 40 has an internal memory 41 and a CPU 42 which communicate with one another, for example, via a suitable data bus, for this purpose. In addition, the control unit 40 has a communication connection to at least the first sensors 11, 12, 13, the second sensors 21, 22, 23 and the communication module 30, for example, via one or more respective CAN connections, one or more respective SPI connections or other suitable data connections. The control unit 40 is further configured, in particular, to carry out the disclosed method described in detail above for each of the multiplicity of vehicle components.

REFERENCE SYMBOL LIST

1 Transportation vehicle
11 First sensor
12 Second sensor
13 Third sensor
21 Fourth sensor
22 Fifth sensor
23 Sixth sensor
30 Communication unit
31 Memory
32 Transponder
40 Control unit
41 Internal memory
42 CPU
51 Satellite
52 Further transportation vehicle
53 Network
51 First method operation
S2a First part of the method operation
S2b Second part of the method operation
S3 Third method operation
S4 Fourth method operation
S5 Fifth method operation
S6 Sixth method operation
S7a Seventh method operation
S7b Next method operation
S8 Eighth method operation
S9 Ninth method operation
S10 Tenth method operation
S11 Eleventh method operation
S12 Twelfth method operation
S13 Thirteenth method operation
S14 Fourteenth method operation
S15 Fifteenth method operation
K1 First context
K2 Second context
K3 Third context
W1a First path
W1b Second path
W2a Third path
W2b Fourth path
W3a Fifth path
W3b Sixth path
W4a Seventh path
W4b Eighth path
W5a Ninth path
W5b Tenth path
W6a Eleventh path
W6b Twelfth path
W7a Thirteenth path
W7b Fourteenth path
W8a Fifteenth path
W8b Sixteenth path
F Error
P Sample value
G1 Upper context-dependent limit value
G1' Upper static limit value
G2 Lower context-dependent limit value
G2' Lower static limit value

The invention claimed is:

1. A method of a transportation vehicle for context-dependent processing of a potential error of a vehicle component, the method comprising:
   determining a current context of the transportation vehicle and at least one vehicle component of the transportation vehicle that is heterogeneous in the current context;
   in response to determining at least one heterogeneous vehicle component, performing heterogeneous verification of the potential error taking into account the at least one heterogeneous vehicle component;
   in response to no heterogeneous vehicle component being determined, determining a context-dependent relevance of the vehicle component; and
   handling the potential error of the vehicle component or initiating an emergency operating mode of the transportation vehicle based on the determined context-dependent relevance.

2. The method of claim 1, wherein the at least one heterogeneous vehicle component differs structurally from the vehicle component and performs the tasks and/or functions of the vehicle component.

3. The method of claim 1, wherein the heterogeneous verification comprises:

determining that no potential error of the at least one heterogeneous vehicle component is present;

determining a context-dependent relevance of the transportation vehicle component; and handling the potential error of the vehicle component or initiating an emergency operating mode of the transportation vehicle based on the determined context-dependent relevance.

4. The method of claim 1, wherein the heterogeneous verification comprises:

determining whether a potential error of the at least one heterogeneous vehicle component is present;

comparing sample values and/or diagnostic values of the vehicle component and the at least one heterogeneous vehicle component; and based on the comparison:
rejecting the potential error of the vehicle component; or determining a context-dependent relevance of the vehicle component and handling the potential error of the vehicle component or initiating an emergency operating mode of the transportation vehicle based on the determined context-dependent relevance.

5. The method of claim 4, wherein, in comparing the sample values and/or diagnostic values, it is determined whether sample values and/or diagnostic values of the vehicle component lie within a range of dispersion of sample values and/or diagnostic values of the at least one heterogeneous vehicle component, wherein the potential error of the vehicle component is rejected in response to the sample values and/or diagnostic values of the at least one heterogeneous vehicle component being located in a range of dispersion of sample values and/or diagnostic values of the at least one heterogeneous vehicle component, and wherein otherwise the context-dependent relevance is determined.

6. The method of claim 1, further comprising:
determining at least one homogeneous vehicle component of the transportation vehicle; and in response to at least one homogeneous vehicle component being determined, performing homogeneous verification of the potential error, taking into account the at least one homogeneous vehicle component, wherein the at least one homogeneous vehicle component is structurally identical to the vehicle component and performs the tasks and/or functions of the vehicle component.

7. The method of claim 1, wherein determining a potential error of a vehicle component comprises:

determining a sample value of the vehicle component within at least one determined metric and, based on the determined context, a set of limit values within the determined metric; and determining a diagnostic value as a quotient of the difference between the determined sample value and the lower limit value and the difference between the upper limit value and the lower limit value, wherein a potential error is determined in response to the sample value not lying within the determined limit values and/or in response to the diagnostic value not having a value between 0 and 1.

8. The method of claim 1, wherein the context is defined based on a plurality of parameters characterizing an environment and/or a driving situation of the transportation vehicle.

9. The method of claim 1, wherein the relevance is determined taking into account a failure rate of the vehicle component that is permissible in the current context and/or an availability of vehicle components that are heterogeneous and/or homogeneous in the current context, and/or wherein the error handling is carried out in response to the determined relevance falling below a predetermined relevance limit value, and wherein the emergency operating mode is initiated in response to the determined relevance exceeding a predetermined relevance limit value.

10. A transportation vehicle comprising:
at least one vehicle component; and a control unit configured to perform context-dependent processing of a potential error of the at least one vehicle component that includes determination of a current context of the transportation vehicle and at least one vehicle component of the transportation vehicle that is heterogeneous in the current context, in response to determination of at least one heterogeneous vehicle component, performing heterogeneous verification of the potential error taking into account the at least one heterogeneous vehicle component, in response to no heterogeneous vehicle component being determined, determining a context-dependent relevance of the vehicle component, and handling the potential error of the vehicle component or initiating an emergency operating mode of the transportation vehicle based on the determined context-dependent relevance.

11. The transportation vehicle of claim 10, wherein the at least one heterogeneous vehicle component differs structurally from the vehicle component and performs the tasks and/or functions of the vehicle component.

12. The transportation vehicle of claim 10, wherein the heterogeneous verification includes:

determination that no potential error of the at least one heterogeneous vehicle component is present;

determination of a context-dependent relevance of the transportation vehicle component; and handling the potential error of the vehicle component or initiating an emergency operating mode of the transportation vehicle based on the determined context-dependent relevance.

13. The transportation vehicle of claim 10, wherein the heterogeneous verification includes determination of whether a potential error of the at least one heterogeneous vehicle component is present, comparison of sample values and/or diagnostic values of the vehicle component and the at least one heterogeneous vehicle component, and based on the comparison, rejecting the potential error of the vehicle component, or determining a context-dependent relevance of the vehicle component and handling the potential error of the vehicle component or initiating an emergency operating mode of the transportation vehicle based on the determined context-dependent relevance.

14. The transportation vehicle of claim 13, wherein, in comparing the sample values and/or diagnostic values, it is determined whether the sample values and/or diagnostic values of the vehicle component lie within a range of dispersion of sample values and/or diagnostic values of the at least one heterogeneous vehicle component, wherein the potential error of the vehicle component is rejected in response to the sample values and/or diagnostic values of the at least one heterogeneous vehicle component being located in a range of dispersion of sample values and/or diagnostic values of the at least one heterogeneous vehicle component, and wherein otherwise the context-dependent relevance is determined.

15. The transportation vehicle of claim 10, wherein the control unit is further configured to determine at least one homogeneous vehicle component of the transportation vehicle, and, in response to at least one homogeneous vehicle component being determined, performing homogeneous verification of the potential error, taking into account the at least one homogeneous vehicle component, wherein the at least one homogeneous vehicle component is structurally identical to the vehicle component and performs the tasks and/or functions of the vehicle component.

16. The transportation vehicle of claim 10, wherein determination of a potential error of a vehicle component includes determination of a sample value of the vehicle component within at least one determined metric and, based on the determined context, a set of limit values within the determined metric, and determination of a diagnostic value as a quotient of the difference between the determined sample value and the lower limit value and the difference between the upper limit value and the lower limit value, wherein a potential error is determined in response to the sample value not lying within the determined limit values and/or in response to the diagnostic value not having a value between 0 and 1.

17. The transportation vehicle of claim 10, wherein the context is defined based on a plurality of parameters characterizing an environment and/or a driving situation of the transportation vehicle.

18. The transportation vehicle of claim 10, wherein the relevance is determined taking into account a failure rate of the vehicle component that is permissible in the current context and/or an availability of vehicle components that are heterogeneous and/or homogeneous in the current context, and/or wherein the error handling is carried out in response to the determined relevance falling below a predetermined relevance limit value, and wherein the emergency operating mode is initiated in response to the determined relevance exceeding a predetermined relevance limit value.

* * * * *